United States Patent [19]

Theilen

[11] 4,445,810
[45] May 1, 1984

[54] METHOD OF MAKING A CUTTING MEMBER AND ARTICLE PRODUCED THEREBY

[75] Inventor: Kurt A. Theilen, Cologne, Fed. Rep. of Germany

[73] Assignee: Lukas-Erzett Vereinigte Schleif und Fraswerkzeugfabriken, Engelskirchen, Fed. Rep. of Germany

[21] Appl. No.: 363,261

[22] Filed: Mar. 29, 1982

[30] Foreign Application Priority Data

Aug. 20, 1981 [DE] Fed. Rep. of Germany ....... 3132860

[51] Int. Cl.³ .............................................. B26D 1/00
[52] U.S. Cl. .................................. 407/118; 76/101 A
[58] Field of Search ..................... 407/118; 76/101 A; 408/144, 145

[56] References Cited

U.S. PATENT DOCUMENTS

| | | | |
|---|---|---|---|
| 2,324,377 | 7/1943 | Fischer | 76/101 A |
| 2,413,989 | 1/1947 | Molner et al. | 76/101 A |
| 3,751,176 | 8/1973 | Von Hollen | 407/118 |
| 4,307,984 | 12/1981 | Patterson | 407/118 |

Primary Examiner—W. D. Bray
Attorney, Agent, or Firm—Watson, Cole, Grindle & Watson

[57] ABSTRACT

A method of making a cutting member and article produced thereby includes a cutter body having a recess and a coaxially aligned elongated shank with an annular gap defined between the cutter body recess and a portion of the shank extending thereinto, such recess being filled by injection with molten metal.

8 Claims, 3 Drawing Figures

METHOD OF MAKING A CUTTING MEMBER AND ARTICLE PRODUCED THEREBY

BACKGROUND OF THE INVENTION

This invention relates to a method of making a cutting member by assembling together a cutter body and an elongated shank, as well as to the cutting member made according to the method.

Cutting members of the type to which the invention is directed, adaptable for manual or machine operation, include a cutter body having serrations or cutting edges thereon, and an elongated shank capable of being clamped into a chuck of a machine to facilitate, for example, a drilling operation.

Some known cutters, especially of the small variety, are of one-piece construction such that the cutter body and shank are turned from solid stock material or, in the case of hard metal, are ground into shape.

On the other hand, prior cutting members of two-piece construction include a cutter body having a threaded recess for threaded engagement with the threads on one end of the shank. Otherwise, for a cutter body of hard metal, hard-solder is utilized for brazing the shank thereto.

The known cutter member assemblies of the aforedescribed type are not without their disadvantages. For example, the cutting member of one-piece construction requires a considerable amount of material, produces much waste and is expensive to machine. And, when subjecting this single-piece construction to heat treatment, a compromise must be reached between the different demands made on the cutter body (extreme hardness) and on the shank (high toughness).

The threaded together cutter body and shank has the particular disadvantage in that the interengaging threads must be precisely machined to assure a tight and secure fit between the cutter body and the shank thus increasing the time and expense of fabrication.

The principle disadvantage in using a hard-solder securement between the parts in that the shank surface sometimes undergoes quality changes at least in the brazing area and therefore has the tendency to break in such area.

SUMMARY OF THE INVENTION

It is an object of the present invention to provide a method of making a cutter member by assembling together a cutter body and an elongated shank with the use of an alloy which is initially in a liquified condition, the method being carried out in such a manner that the quality of the parts to be connected is not impaired by the interconnecting operation.

This broad objective of the invention is carried out by the provision of recess in the cutter body coaxial with the shank, the recess being out-of-round in cross-section at least in part. One end of the shank is extended into the recess coaxial with the cutter body and such one end is non-circular or out-of-round in cross-section at least in part and is of a size less than the size of the recess so as to define an annular gap therewith. The cutter body and shank are held together by some suitable means to maintain the annular opening, and an alloy initially in a liquified condition is injected into the annular gap for securely interconnecting the shank cutter body together.

DETAILED DESCRIPTION OF THE INVENTION

Figure 1:
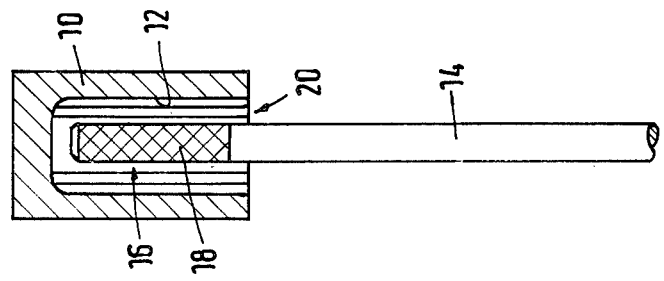
FIG. 1 is a sectional view of the cutter body showing one end of the shank held in the body recess prior to injecting the alloy into the annular gap.

Turning now to the drawings wherein like reference characters refer to like and corresponding parts throughout the several views, the cutting member includes a blank of material forming a cutter body 10 of generally cylindrical configuration (other configurations are, of course, possible) having a blind recess 12 coaxial therewith, and an elongated shank 14. The recess is of a pot-like shape and is out-of-round in cross-section at least in part, such as polygonal, oval, etc. One end 16 of shank 14 extends into recess 12, has a knurled outer surface 18 and is otherwise out-of-round at least in part, such as polygonal, oval, etc. Extension 16 of the shank has substantially the same basic diameter as the remainder of the shank extending outwardly of body 10, so that the shank may be simply cut to length from round stock which may, for example, be drawn into the desired shape and subsequently provided with knurling 18. Thus, only a few simple and material-saving operations are required to fabricate the shank. The material of the two-part assembly may be the same, but are usually of different selected materials. For example, the cutter body may comprise an HSS steel (high speed steel or carbon tool steel) already hardened to a hardness 64. .65 HRc (degrees Rockwell hardness), while the shank may comprise a plain steel C 35 K having a minimum strength characteristic of 50 Kp/mm². The two parts are then clamped together coaxially in the position shown in FIG. 1 by means of a suitable holder (not shown). Before clamping the parts together, the cutter body and/or the shank may be subjected to the same or different heat treatments.

Figure 2:
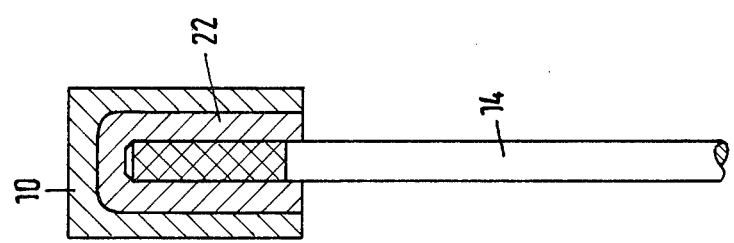
FIG. 2 is a view similar to FIG. 1 but with the parts interconnected together.

End 18 of the shank is of a size less than the size of recess 12 so as to therewith define an annular gap 20. While in the position of FIG. 1, an alloy, is injected into the space between end 18 and the wall of recess 12 so as to fill gap 20 which includes the space between the end tip of the shank and the bottom wall of the recess. A commercial die-casting apparatus is used for injecting the alloy into gap 20 in a liquified condition for securely interconnecting the shank with the cutter body upon solidification of the alloy shown at 22 in FIG. 2. Since the cutter body has a circular cylindrical outer shape, it may be easily handled for mounting shank 14 within the jaws of a chuck to facilitate the application of serrations or cutting edges on to the cutter body.

After the alloy has been injected, there is formed a tight seal between the knurled shank and the solidified alloy and between the wall of recess 12 and the solidified alloy. This bond is more than sufficient under normal operating conditions to transfer the torque between the shank and the cutter body.

Figure 3:
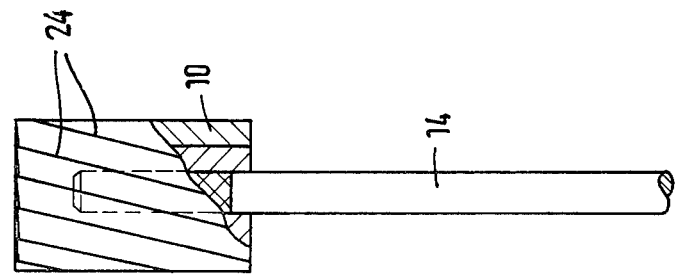
FIG. 3 is a view similar to FIG. 1 but with a showing of the completed cutter body.

The shank, preferably cold-drawn and of round stock with dimensional accuracy, can now be gripped within the jaws of a chuck to facilitate the application of serrations of cutting edges 24 (FIG. 3) on the outer surface of body 10 in such a manner that the shank and serrations are centered with precision relative to one another, thereby resulting in excellent radial-run-out properties.

It should be recognized that interconnecting the cutter body and shank together according to the invention via injection of an alloy, is essentially different from the known hard-soldering technique. In this latter approach, there is intercrystalline bonding, that is, the solder alloys with the base metal which, for such purpose, must be subjected to a relatively high temperature which tends to alter the quality thereof. The method according to the invention, however, results in a positive securement between the connected parts, which is capable of transmitting the torque therebetween. The injection process according to the invention is carried out sufficiently rapidly so that no quality-reducing heating of the shank or cutter body occurs. Thus, both parts can be optimally constructed, not only with regard to the selection of the materials thereof, but also respecting any heat treatment prior to the interconnecting operation. It is also possible to connect a completed shank with a cutter body blank after which cutting edges or serrations are applied along the outer surface thereof. This yields equally good radial-run out properties, as in the case of a single-piece cutting member having a finish-round shank.

If the cutter body is sintered out of hardened metal, an extensive amount of the costly hard metal can be saved by reason of the recess which may be made as large as possible. Moreover, the present technique gives rise to further savings in cost of materials and time during fabrication of the shank since it was heretofore customary when making a hard-solder connection, to place the shank at its end face against the cutter body. In order to obtain a sufficiently large connection surface, the shank was provided with a flared-out flange so that the remainder of the shank had to be thereafter shaped into the nominal shaft diameter. The machining work and material expended during such a technique can be avoided by the method according to the invention, since the carrier to torque-transfer surfaces on the shank can conveniently be located on a smaller diameter as compared to the nominal shank diameter.

Obviously, other modifications and variations of the present invention are made possible in the light of the above teachings. It is therefore to be understood that within the scope of the appended claims the intention may be practiced otherwise than as specifically described.

In the embodiment described above, only metallic alloys were referred to as the bonding agent between the shank and the tool body. The bonding material not being involved in an intercrystalline connection with either the shank or the body, i.e. no soldered, brazed, or welded connection being provided, other materials of aquivalent nature could be envisaged for the same purpose. Such materials could be, for example, ceramics including carbides, glasses, glazes, or organic compounds such as plastic material. The ceramic materials, however, have the drawback of extended curing times interfering with mass production while the organic compounds, in general, have insufficient strength. Whenever materials of the types mentioned above would be improved such that the disadvantages are overcome, they could be used in the process as claimed, for being equivalent to metallic alloys.

What is claimed is:

1. A method of making a cutting member by assembling together a cutter body and an elongated shank, comprising the steps of:

providing a recess of a predetermined size in the cutter body coaxial with the shank, the recess being out-of-round in cross-section at least in part;

extending one end of the shank into the recess coaxial with the cutter body, the one end being out-of-round in cross-section at least in part and being of a size less than said predetermined size so as to define an annular gap therewith;

holding the cutter body and shank together to maintain said annular opening; and injecting into said annular gap an alloy in a liquified condition for securely interconnecting the shank with the cutter body.

2. The method according to claim 1, comprising the further step of subjecting the cutter body and the shank to heat treatment prior to the holding step.

3. The method according to claim 1, comprising the further step of subjecting the cutter body to heat treatment prior to the holding step.

4. The method according to claim 1, comprising the further step of subjecting the shank to heat treatment prior to the holding step.

5. The method according to claim 1, comprising the further step of providing the outer surface of the cutter body with cutting serrations after being interconnected with the shank.

6. A cutting member comprising a cutter body and an elongated shank of preferably different metallic heat-treated materials, the cutter body having a recess of a predetermined size coaxial with the shank, the recess being out-of-round in cross-section at least in part, one end of the shank extending into the recess coaxial with the cutter body, the one end being out-of-round in cross-section at least in part and being of a size less than said predetermined size so as to define an annular gap therewith, a portion of the shank lying outwardly of the cutter body, and an alloy initially in a liquified condition filling the gap for securely interconnecting the shank with the cutter body.

7. The cutting member according to claim 6, wherein the shank comprises a steel member having a minimum strength characteristic of 50 Kp/mm$^2$.

8. The cutting member according to claim 6 or 7, wherein the alloy is selected from the group of alloys having a melting temperature substantially higher than those temperatures to which the cutting member is subjected in use.

* * * * *